(No Model.)

J. T. HASTINGS.
ARTIFICIAL BAIT.

No. 534,506. Patented Feb. 19, 1895.

UNITED STATES PATENT OFFICE.

JAMES T. HASTINGS, OF CHICAGO, ILLINOIS.

ARTIFICIAL BAIT.

SPECIFICATION forming part of Letters Patent No. 534,506, dated February 19, 1895.

Application filed October 19, 1894. Serial No. 526,368. (No model.)

*To all whom it may concern:*

Be it known that I, JAMES T. HASTINGS, a citizen of the United States, residing at Chicago, in the county of Cook and State of Illinois, have invented certain new and useful Improvements in Artificial Bait, of which the following is a specification.

One object of the present invention is to provide an artificial bait which when associated with the hook will hide it and prevent its gathering weeds while not interfering with its taking fish even as much as a line bait would. In carrying out this object I so construct the bait that it will yield to compression as easily, or even more easily than would the body of the animal it resembles, and I so arrange the bait with relation to the hook that some portion of the bait shall lie sufficiently close to the point of the hook to prevent its gathering weeds, said portion being readily compressible so that when taken by the fish it will be forced away from the point and leave the latter free to do its work.

I believe myself to be the first to so arrange such a yielding or compressible bait—or a bait having a yielding or compressible part—with relation to a hook that the latter is prevented from gathering weeds without having its efficiency as a hook destroyed, and I therefore desire to have it understood that my invention in its broadest aspect, is not limited to a bait made to resemble any particular animal, or made of any particular material, or constructed in any particular manner, or arranged in any particular relation to the hook, albeit I prefer to construct the bait hollow and of a soft, yielding material—such as rubber.

With this understanding I declare my invention to consist in the features of novelty that are particularly pointed out in the claims, and in order that it may be more fully understood I will describe it with reference to the accompanying drawings which are made a part hereof, and in which—

Figure 1:
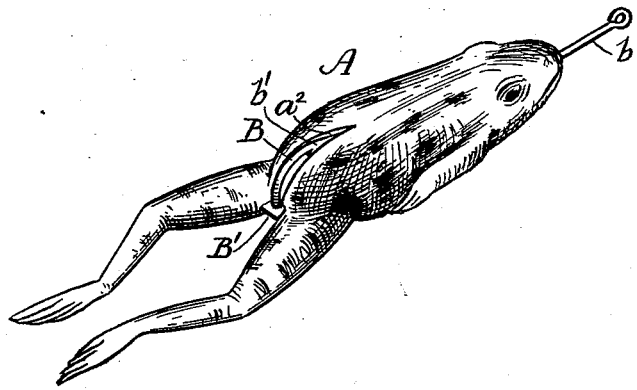
Figure 2:
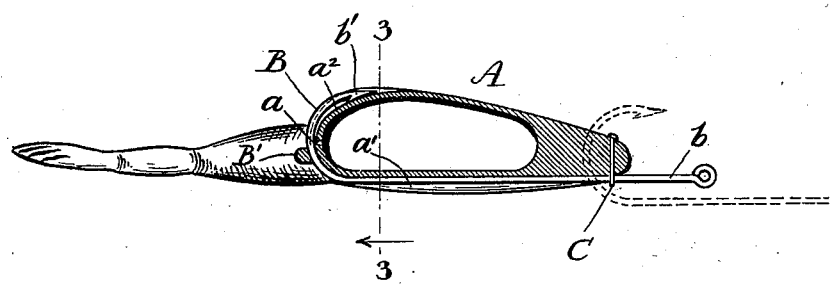
Figure 3:
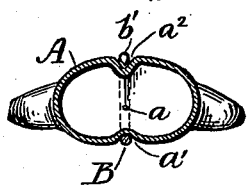

Figure 1 is a perspective view of a bait and hook constructed and associated in accordance with the invention. Figs. 2 and 3 are respectively a longitudinal and a transverse section thereof.

For the purposes of this specification I have selected a bait A made in the semblance of a frog, but as before intimated, this is merely an example and is not to be regarded as a limitation. It is preferably made of soft rubber and its body,—especially the lower portion of it,—is hollow, the walls being quite thin, so that they can be easily collapsed, a hole $a$ being provided for permitting the escape of air. Preferably the legs and head are solid, with a preponderance of weight in the legs, so that as it is drawn through the water the head will be slightly elevated.

A bait thus constructed may, if desired, be used as live bait is customarily used,—that is to say, a hook may be passed through a perforation through its head as indicated by dotted lines in Fig. 2. I prefer, however, to so associate it with the hook that it prevents the hook from gathering weeds. To this end the stem $b$ of the hook B is carried along the belly and the point $b'$ carried up over the back, grooves $a'$ and $a^2$ being preferably provided for receiving them. The bait and hook may be secured together in any suitable manner. As shown in the drawings the stem $b$ is secured by a staple C which is driven through the head and clinched and the lower part of the hook passes through a perforated web $B'$.

The walls of the body are sufficiently strong to effectually resist the pressure of weeds and grass, but when taken by a fish they will collapse and leave the point of the hook free to act.

What I claim as new, and desire to secure by Letters Patent, is—

1. The combination with a fish-hook, of an artificial bait secured thereto and having a depression for receiving the beard of the hook, the portion of the bait in immediate proximity to the point being yielding, substantially as set forth.

2. The combination with a fish hook, of an artificial bait secured thereto and having depressions for receiving the stem and point of the hook, that portion of the bait lying beneath the point of the hook being yielding, substantially as set forth.

3. The combination with a fish hook, of an artificial bait secured thereto and having a hollow compressible portion located between the stem and point of the hook, substantially as set forth.

4. The combination with a fish-hook of an artificial bait made in the form of a frog and secured thereto, the hook being disposed with its stem along the belly of the frog and with its point extending over the back and toward the head of the frog, that portion of the frog which lies beneath the point of the hook being hollow and compressible, substantially as set forth.

JAMES T. HASTINGS.

Witnesses:
D. M. HOPKINS,
N. C. GRIDLEY.